United States Patent [19]

Fuchs et al.

[11] Patent Number: 5,401,082
[45] Date of Patent: Mar. 28, 1995

[54] ANTI-LOCK BRAKE CONTROL SYSTEM WITH YAW CONTROL

[75] Inventors: Steffen Fuchs, Untergruppenbach; Thomas Meier, Freiberg A Neckar, both of Germany

[73] Assignee: Robert Bosch GmbH, Stuttgart, Germany

[21] Appl. No.: 843,419

[22] Filed: Feb. 27, 1992

[30] Foreign Application Priority Data

Mar. 7, 1991 [DE] Germany ............... 41 07 278.2

[51] Int. Cl.[6] .............................. B60T 8/10
[52] U.S. Cl. .......................... 303/111; 303/100
[58] Field of Search ............ 303/100, 113 AP, 111, 303/9.62

[56] References Cited

U.S. PATENT DOCUMENTS

| | | | |
|---|---|---|---|
| 3,840,278 | 10/1974 | Fleischer et al. | 303/111 |
| 4,592,599 | 6/1986 | Belart | 303/111 |
| 4,593,955 | 6/1986 | Leiber | 303/111 |
| 4,632,467 | 12/1986 | Kircher et al. | 303/111 |
| 4,657,314 | 4/1987 | Leiber | 303/100 |
| 4,755,945 | 7/1988 | Kade et al. | 303/100 |
| 4,862,368 | 8/1989 | Kost et al. | 303/100 |
| 4,881,785 | 11/1989 | Ushijima et al. | 303/100 |
| 4,893,880 | 1/1990 | Arikawa | 303/110 |
| 4,917,444 | 4/1990 | Ishido | 363/100 |
| 4,962,971 | 10/1990 | Miyake | 363/100 |
| 4,979,784 | 12/1990 | Arikawa | 303/100 |

FOREIGN PATENT DOCUMENTS

| | | |
|---|---|---|
| 3505268 | 2/1986 | Germany . |
| 1581943 | 12/1980 | United Kingdom . |
| 1599086 | 9/1981 | United Kingdom . |

OTHER PUBLICATIONS

Bosch Technische Berichte, Band 7 (1980) Heft 2 pp. 86–87.

*Primary Examiner*—Matthew C. Graham
*Attorney, Agent, or Firm*—Felfe & Lynch

[57] ABSTRACT

When ABS control is active to reduce brake pressure at a front wheel when an instability occurs at that wheel, the brake pressure at the diagonally located rear wheel is controlled in unison unless ABS control due to an instability is active at that rear wheel.

1 Claim, 1 Drawing Sheet

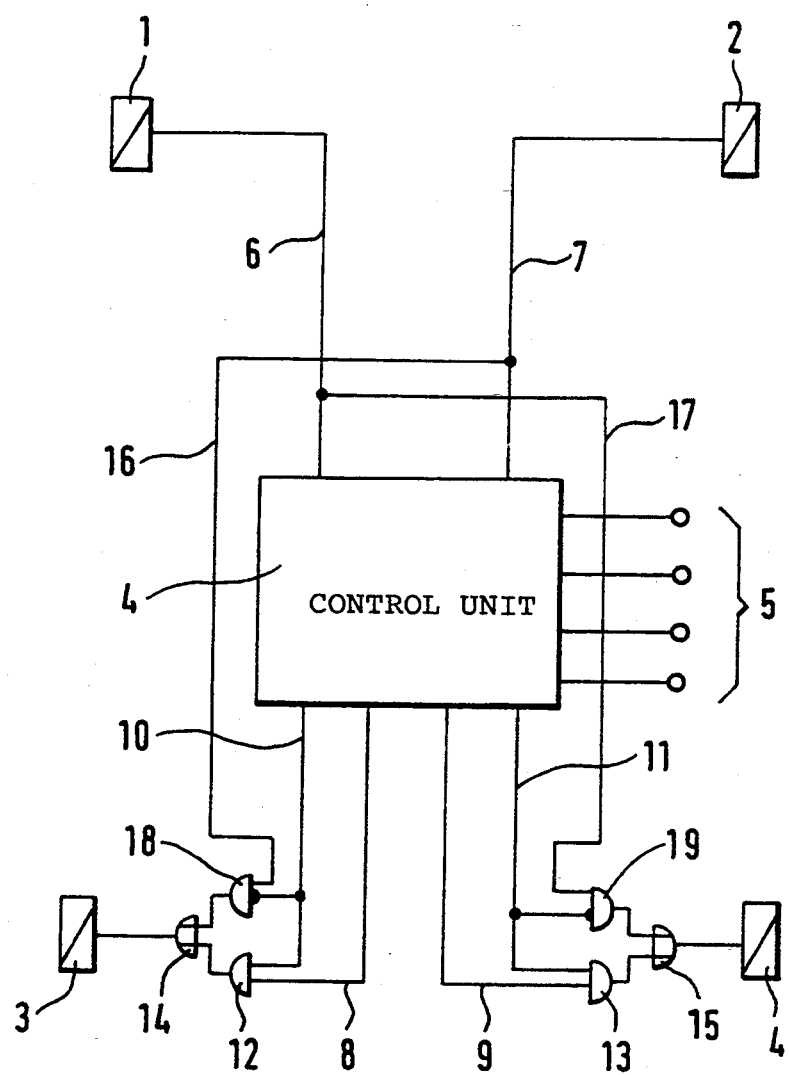

ANTI-LOCK BRAKE CONTROL SYSTEM WITH YAW CONTROL

BACKGROUND OF THE INVENTION

The invention relates to an anti-lock brake control system for a four wheeled vehicle in which brake pressure is individually controlled at the four wheels when instabilities occur at the corresponding wheels. Such a system is disclosed, for example, in *Bosch Technische Berichte,* Vol. 7 (1980), No. 2, pages 86 and 87, FIG. 35 and FIG. 40.

SUMMARY OF THE INVENTION

When ABS control is active to control the brake pressure at a front wheel due to an instability at that front wheel, the brake pressure at the diagonally opposed rear wheel is controlled in unison unless ABS control due to an instability is already active at that rear wheel.

The criteria for instability include drive slippage and the wheel deceleration. For example, when ABS control is active to reduce brake pressure at a front wheel due to slippage at that front wheel, the brake pressure at the diagonally opposed rear wheel is reduced in unison.

Instability may also be determined when wheel deceleration exceeds a threshold, when both slippage and wheel deceleration exceed respective thresholds, or when the sum of slippage and deceleration exceed a threshold. In the latter instance the criteria are multiplied by appropriately dimensioned weighted constants as disclosed in PCT International Application No. EP 89/01377, incorporated herein by reference which corresponds to U.S. application Ser. No. 07/691,015, incorporated herein by reference.

The advantage of the invention is that the vehicle yaws less around its vertical axis in the case of a unilateral $\mu$ jump, namely from a high $\mu$ to a low $\mu$ due to the diagonal reduction of pressure. Furthermore, shorter braking distances are achieved. A delay of the build-up of yawing moment can be superimposed on the individual control action at the front wheels, which delays the pressure build-up at the high wheel (higher $\mu$—last to slip) when a pressure control is exerted on the low wheel (lower $\mu$—first to slip), so as to prevent any rapid build-up of yawing moment.

DESCRIPTION OF THE DRAWING

The sole figure is a diagrammatic representation of a brake control system according to the invention.

DETAILED DESCRIPTION OF THE PREFERRED EMBODIMENT

In FIG. 1, solenoid 3/3 valves 1 and 2 are associated with the front wheels while solenoid 3/3 valves 3 and 4 are associated with the rear wheels. Each 3/3 valve has, by definition, three positions and three connections. The signals of velocity sensors associated with the four wheels (not shown) are fed to a control unit 4 via terminals 5. From these signals the controller derives brake pressure control signals for lowering pressure, maintaining pressure constant, and for increasing pressure, which control signals are delivered to the 3/3 valves 1 to 4 through respective lines 6, 7, 8 and 9 for the individual control of the brake pressure at the individual wheels.

The units of the control apparatus responsible for controlling the brake pressure at the rear wheels send signals through lines 10 and 11 whenever and for as long as the control is active at the corresponding wheel. Thus, if the control for one of the rear wheels is active, a signal appears on one of the lines 10 or 11 which renders a corresponding AND gate 12 or 13 conductive for the brake pressure control signals on line 8 or 9 from the control apparatus 4, so that an operation of valve 3 or 4 becomes possible through an OR gate 14 or 15. The valve 3 is connected through a line 16, an AND gate 18 and the OR gate 14 to the actuating line 7. A corresponding connection exists between the actuating line 6 and the valve 4 via a line 17, an AND gate 19 and the OR gate 15. If the individual control operates on one of the rear wheels, the corresponding AND gate 18 or 19 is blocked (inverted input) and the connection of line 6 to valve 4 or of line 7 to valve 3 is interrupted. The individual control is performed on the corresponding rear wheel. If, however, no individual control is operative at the rear wheel and an individual control begins at the diagonally located front wheel, then the corresponding rear wheel is also controlled in unison therewith.

The controller 4 in FIG. 1 can also superimpose a delay in build up of the yawing moment on the control action at the front wheels. For example, if the pressure at the brake of wheel 1 is reduced, the brake pressure at wheel 2 cannot become higher but is held constant and is only increased together with the pressure at wheel 1.

The foregoing is exemplary and not intended to limit the scope of the claims which follow.

We claim:

1. Antilock control system for a vehicle having two front wheels and two rear wheels, said system comprising
    means for determining when instabilities occur at each of the four wheels,
    means for individually controlling brake pressure at each of the four wheels when instabilities occur at respective said wheels, and
    means for controlling brake pressure at each rear wheel in unison with the controlling at a diagonally opposite front wheel when no instability occurs at said rear wheel and brake pressure is being controlled at the diagonally opposite front wheel by said means for individually controlling brake pressure.

* * * * *